US010340770B2

(12) United States Patent
Aoi et al.

(10) Patent No.: US 10,340,770 B2
(45) Date of Patent: Jul. 2, 2019

(54) STATOR UNIT, MOTOR, AND PARALLEL FAN

(71) Applicant: Nidec Corporation, Kyoto (JP)

(72) Inventors: Hideki Aoi, Kyoto (JP); Megumi Michishita, Kyoto (JP); Atsushi Michishita, Kyoto (JP); Sakae Nogami, Kyoto (JP); Takaya Okuno, Kyoto (JP); Shinsuke Hamano, Kyoto (JP); Hiroshi Miyamoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 125 days.

(21) Appl. No.: 15/461,517

(22) Filed: Mar. 17, 2017

(65) Prior Publication Data
US 2017/0288497 A1 Oct. 5, 2017

(30) Foreign Application Priority Data

Mar. 31, 2016 (JP) .................................. 2016-070891

(51) Int. Cl.
*H02K 7/08* (2006.01)
*H02K 7/14* (2006.01)
(Continued)

(52) U.S. Cl.
CPC ............... *H02K 7/14* (2013.01); *F04D 25/06* (2013.01); *F04D 25/166* (2013.01); *H02K 1/146* (2013.01);
(Continued)

(58) Field of Classification Search
CPC .. H02K 5/00; H02K 5/08; H02K 5/10; H02K 5/12; H02K 5/128; H02K 5/16;
(Continued)

(56) References Cited

U.S. PATENT DOCUMENTS 5,264,748 A * 11/1993 Ootsuka ................. F16C 17/04
310/90
6,359,354 B1 * 3/2002 Watanabe ................ H02K 5/08
310/154.45
(Continued)

FOREIGN PATENT DOCUMENTS

JP 59-70163 A 4/1984
JP 10-191611 A 7/1998
(Continued)

*Primary Examiner* — Tran N Nguyen
(74) *Attorney, Agent, or Firm* — Keating & Bennett, LLP

(57) ABSTRACT

This stator unit includes a cylindrical bearing housing arranged to extend along a central axis extending in a vertical direction; a base member arranged to fix the bearing housing; a stator fixed to an outer circumferential surface of the bearing housing; and a mold resin portion arranged to cover the stator. The stator includes a stator core including a plurality of teeth arranged to project radially outward; an insulator arranged to cover a portion of a surface of the stator core; and a plurality of coils each of which is defined by a conducting wire wound around a separate one of the teeth with the insulator therebetween. A sealing agent is arranged between at least two of the outer circumferential surface of the bearing housing, the stator core, and the insulator.

13 Claims, 10 Drawing Sheets

(51) Int. Cl.
*F04D 25/06* (2006.01)
*F04D 25/16* (2006.01)
*H02K 1/14* (2006.01)
*H02K 1/27* (2006.01)
*H02K 3/18* (2006.01)
*H02K 3/34* (2006.01)

(52) U.S. Cl.
CPC .............. *H02K 1/27* (2013.01); *H02K 3/18* (2013.01); *H02K 3/345* (2013.01); *H02K 7/08* (2013.01)

(58) Field of Classification Search
CPC ........ H02K 5/163; H02K 5/1675; H02K 5/17; H02K 5/173; H02K 5/22; H02K 7/00; H02K 7/14; H02K 7/08; H02K 7/085; H02K 7/166; H02K 11/00; H02K 11/33; H02K 15/00; H02K 15/02; H02K 15/02812; H02K 15/14; H02K 29/00; F04D 25/06; F04D 25/0613; F04D 25/062; F04D 25/0633; F04D 25/064; F04D 25/0646; F04D 25/068; F04D 25/0686; F04D 25/0693; F04D 29/00; F04D 29/02; F04D 29/023; F04D 29/08
See application file for complete search history.

(56) References Cited

U.S. PATENT DOCUMENTS

| | | | | |
|---|---|---|---|---|
| 6,455,961 | B1* | 9/2002 | Higuchi | H02K 1/187 310/216.113 |
| 6,828,706 | B2 | 12/2004 | Kudo et al. | |
| 2002/0047397 | A1* | 4/2002 | Osawa | H02K 1/187 310/90 |
| 2006/0006094 | A1* | 1/2006 | Hofmann | H02K 5/10 206/706 |
| 2010/0133928 | A1* | 6/2010 | Harata | H02K 1/187 310/43 |
| 2014/0294621 | A1 | 10/2014 | Narita | |

FOREIGN PATENT DOCUMENTS

| | | |
|---|---|---|
| JP | 11-252867 A | 9/1999 |
| JP | 2000-116098 A | 4/2000 |
| JP | 2003-111373 A | 4/2003 |
| JP | 2014-209837 A | 11/2014 |

\* cited by examiner

US 10,340,770 B2

STATOR UNIT, MOTOR, AND PARALLEL FAN

CROSS REFERENCE TO RELATED APPLICATIONS

This application claims the benefit of priority to Japanese Patent Application No. 2016-070891 filed on Mar. 31, 2016. The entire contents of this application are hereby incorporated herein by reference.

BACKGROUND OF THE INVENTION

1. Field of the Invention

The present invention relates to a stator unit, a motor, and a parallel fan.

2. Description of the Related Art

A so-called molded motor, which includes a rotor and a mold resin portion in which a stator is buried, has been known. The molded motor is excellent in waterproof performance of the stator and in vibration-proof and soundproof performance when the motor is running. A known molded motor is described in, for example, JP-A 59-70163.

In addition, an outer-rotor fan motor which is used as an axial fan has been known. A known fan motor is described in, for example, JP-A 2014-209837.

In recent years, a technique of covering the stator with a molding resin has been proposed even for the outer-rotor fan motor to achieve improved waterproof performance. However, motors used in communication base stations, where the motors are exposed to outside air with high probability, and motors used for household electrical appliances, such as refrigerators, are required to meet higher waterproof standards, such as those of salt spray tests.

SUMMARY OF THE INVENTION

A stator unit according to a preferred embodiment of the present invention includes a cylindrical bearing housing arranged to extend along a central axis extending in a vertical direction; a base member arranged to fix the bearing housing; a stator fixed to an outer circumferential surface of the bearing housing; and a mold resin portion arranged to cover the stator. The stator includes a stator core including a plurality of teeth arranged to project radially outward; an insulator arranged to cover a portion of a surface of the stator core; and a plurality of coils each of which is defined by a conducting wire wound around a separate one of the teeth with the insulator therebetween. A sealing agent is arranged between at least two of the outer circumferential surface of the bearing housing, the stator core, and the insulator.

In the stator unit according to the above preferred embodiment of the present invention, the sealing agent arranged between at least two of the bearing housing, the stator core, and the insulator closes a gap therebetween, reducing the likelihood of intrusion of water.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor including a stator unit is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a circuit board is arranged with respect to a stator is a lower side, and the shape of each member or portion and relative positions of different members or portions will be described based on the above assumptions. It should be noted, however, that the above definitions of the vertical direction and the upper and lower sides are not meant to restrict in any way the orientation of a motor according to any preferred embodiment of the present invention at the time of manufacture or when in use.

Figure 1:
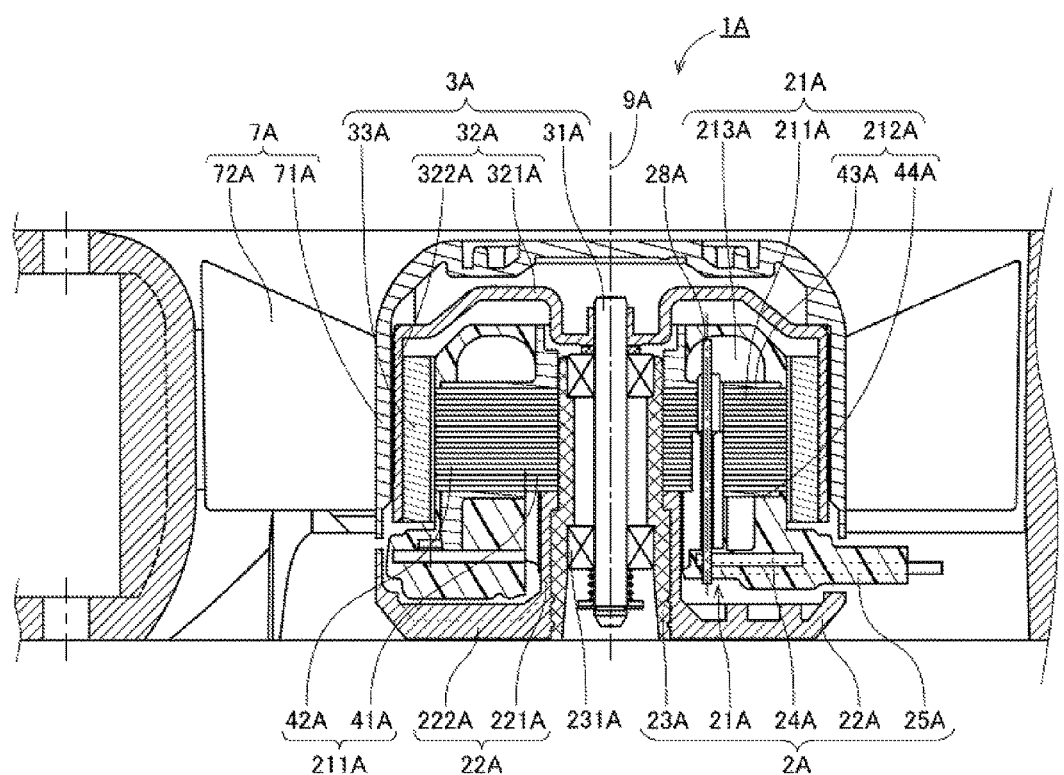
FIG. 1 is a vertical sectional view of a motor according to a first preferred embodiment of the present invention.
Figure 2:
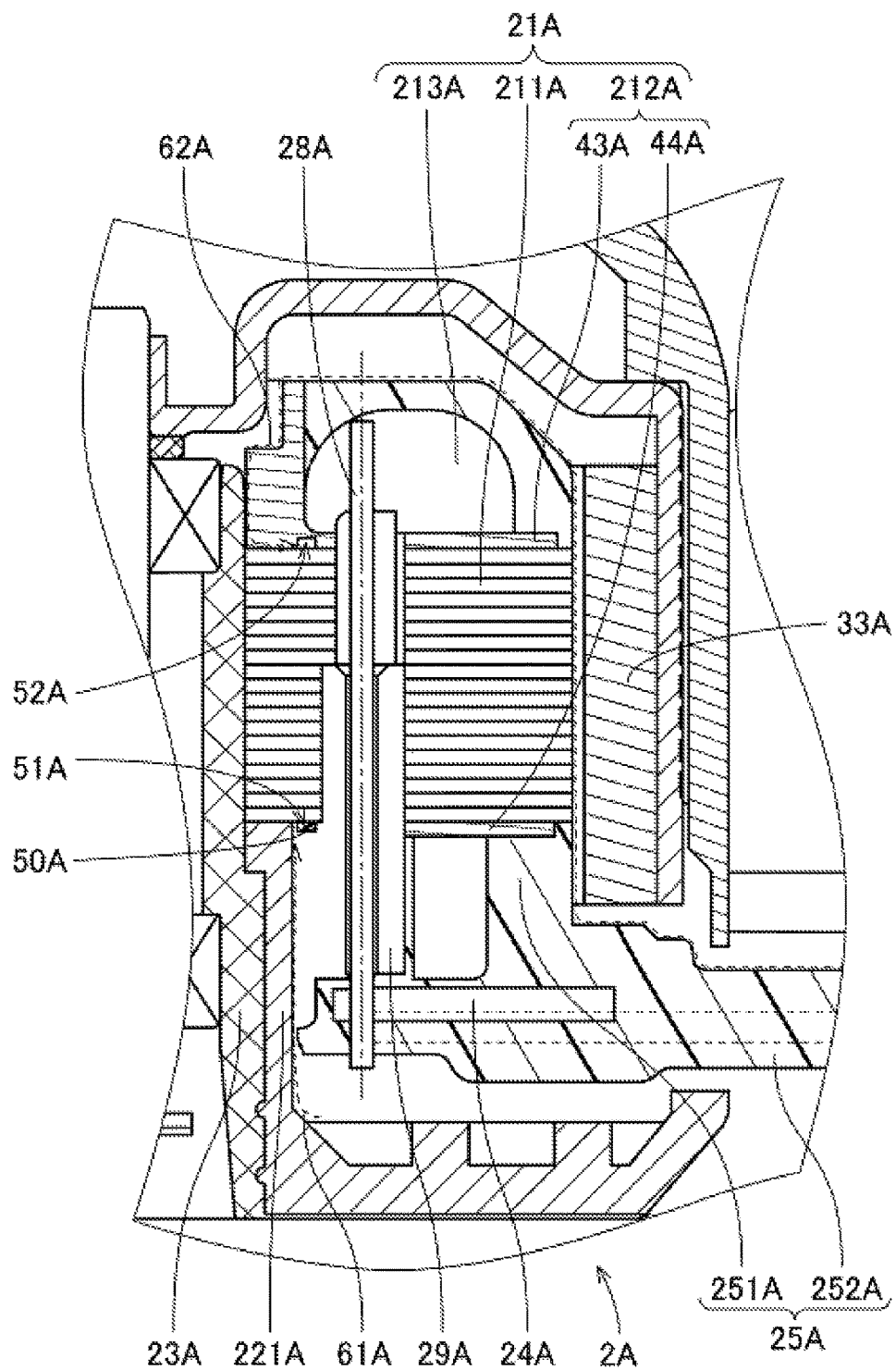
FIG. 2 is a partial vertical sectional view of the motor according to the first preferred embodiment of the present invention.

FIG. 1 is a vertical sectional view of a motor 1A including a stator unit 2A according to a first preferred embodiment of the present invention, the stator unit 2A including a stator 21A, a base member 22A, a bearing housing 23A, a circuit board 24A, and a mold resin portion 25A. FIG. 2 is a partial vertical sectional view of the motor 1A, in which a binding pin 28A, which will be described below, is shown.

The motor 1A is used, for example, as a fan motor that supplies a cooling air flow to a household electrical appliance, such as a refrigerator, or in a communication base station in which a plurality of electronic devices are installed. The motor 1A includes an impeller 7A including a plurality of blades 72A. Note that a motor according to another preferred embodiment of the present invention may not include an impeller.

Referring to FIG. 1, the motor 1A includes the stator unit 2A and a rotor unit 3A. The rotor unit 3A is supported to be rotatable with respect to the stator unit 2A. In addition, the rotor unit 3A is arranged to rotate about a central axis 9A extending in the vertical direction.

The rotor unit 3A includes a shaft 31A, a rotor holder 32A, and a plurality of magnets 33A. The shaft 31A is a columnar member arranged to extend along the central axis 9A. At least a portion of the shaft 31A is arranged radially inside of the bearing housing 23A. The shaft 31A is rotatably supported by the base member 22A through bearing portions 231A. The shaft 31A is thus capable of rotating about the central axis 9A.

A metal, such as iron, which is a magnetic material, for example, is used as a material of the rotor holder 32A. The rotor holder 32A includes a holder top plate portion 321A and a holder cylindrical portion 322A. The holder top plate portion 321A is arranged to extend substantially perpendicularly to the central axis 9A. A central portion of the holder top plate portion 321A is fixed to the shaft 31A. The rotor holder 32A is thus arranged to rotate together with the shaft 31A. The holder cylindrical portion 322A is arranged to extend axially downward from an outer circumferential portion of the holder top plate portion 321A to assume a cylindrical shape.

As illustrated in FIG. 1, the motor 1A according to the present preferred embodiment includes the impeller 7A so that the motor 1A can be used as the fan motor to supply an air flow. The impeller 7A includes an impeller cup 71A and the plurality of blades 72A. The impeller cup 71A is fixed to the rotor holder 32A. The blades 72A are arranged to extend radially outward from an outer circumferential surface of the impeller cup 71A. While the motor 1A is running, the impeller 7A rotates together with the rotor holder 32A and the shaft 31A. The blades 72A are arranged at substantially regular intervals in the circumferential direction. Note that the number of blades is not limited to particular values.

The stator unit 2A includes the stator 21A, the base member 22A, the bearing housing 23A, the circuit board 24A, and the mold resin portion 25A. The base member 22A includes a base cylindrical portion 221A and a base bottom plate portion 222A. The base cylindrical portion 221A is arranged to extend along the central axis 9A to assume a cylindrical shape. The base bottom plate portion 222A is arranged to extend radially outward from a lower end portion of the base cylindrical portion 221A.

The stator 21A is an armature fixed to an outer circumferential surface of the bearing housing 23A. The stator 21A includes a stator core 211A, an insulator 212A, and a plurality of coils 213A, as described in detail below. The stator core 211A includes a core back 41A in the shape of a circular ring and arranged to surround the central axis 9A, and a plurality of teeth 42A arranged to project radially outward.

Figure 1A:
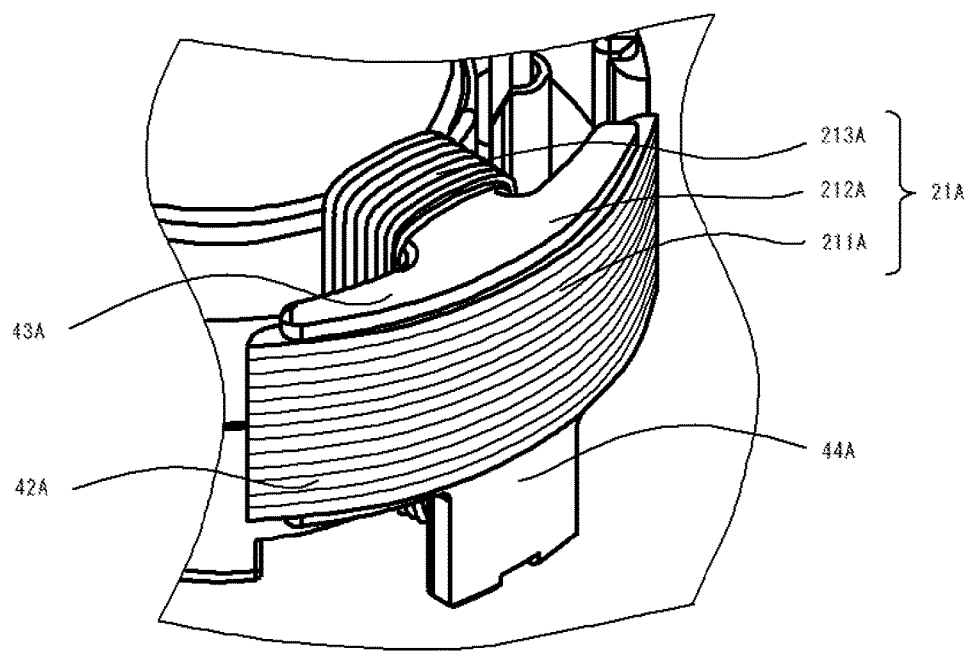
FIG. 1A is a partial perspective view of the motor according to a first preferred embodiment of the present invention.

The insulator 212A is attached to the stator core 211A to cover at least a portion of a surface of the stator core 211A, as shown in FIGS. 1 and 1A. A resin, which is an insulator, is used as a material of the insulator 212A. The insulator 212A includes an upper insulator 43A arranged to cover an upper portion of the stator core 211A, and a lower insulator 44A arranged to cover a lower portion of the stator core 211A. Each coil 213A is defined by a conducting wire wound around a separate one of the teeth 42A with the insulator 212A therebetween.

The bearing housing 23A according to the present preferred embodiment is a cylindrical member arranged to extend along the central axis 9A extending in the vertical direction. A lower portion of the bearing housing 23A is fixed to an inner circumferential surface of the base member 22A through, for example, an adhesive. Each bearing portion 231A is arranged radially inside of the bearing housing 23A. A ball bearing, for example, is used as each bearing portion 231A. An outer race of the bearing portion 231A is fixed to an inner circumferential surface of the bearing housing 23A. An inner race of the bearing portion 231A is fixed to the shaft 31A, which will be described below, to support the shaft 31A. The shaft 31A is thus supported to be rotatable with respect to the base member 22A. Note that the motor 1A may alternatively include a bearing portion of another type, such as, for example, a plain bearing or a fluid bearing, in place of the ball bearings.

The circuit board 24A is electrically connected to the stator 21A. The circuit board 24A is arranged below the stator 21A and substantially perpendicularly to the central axis 9A. The circuit board 24A is fixed to a lower end portion of the insulator 212A through, for example, welding. An electrical circuit to supply electric drive currents to the coils 213A is mounted on the circuit board 24A. End portions of the conducting wires defining the coils 213A are electrically connected to the electrical circuit on the circuit board 24A. Electric currents supplied from an external power supply are passed to the coils 213A through the circuit board 24A.

The stator 21A further includes the binding pin 28A, which makes it easier to connect the conducting wires to the circuit board 24A to reduce the likelihood of poor connection therebetween. The end portions of the conducting wires drawn out from the coils 213A are bound around the binding pin 28A. A lower end portion of the binding pin 28A is electrically connected to the circuit board 24A, and is fixed to the circuit board 24A. As illustrated in FIG. 2, the insulator 212A includes a cylindrical pin support portion 29A arranged to support the binding pin 28A. The pin support portion 29A is arranged to cover an outer circumferential surface of the binding pin 28A in a cylindrical fashion. This reduces the likelihood of intrusion of water through a gap between the binding pin 28A and the insulator 212A, leading to improved waterproof performance of the stator unit 2A.

The mold resin portion 25A is a member made of a resin and arranged to hold the stator 21A and the circuit board 24A. A thermosetting unsaturated polyester resin, for example, is used as a material of the mold resin portion 25A. The mold resin portion 25A is obtained by pouring the resin into a cavity in a mold in which the stator 21A and the circuit board 24A are housed, and curing the resin. That is, the mold resin portion 25A is a resin-molded product produced with the stator 21A and the circuit board 24A as inserts. Accordingly, each of the stator 21A and the circuit board 24A is at least in part covered with the mold resin portion 25A.

As illustrated in FIG. 2, the mold resin portion 25A according to the present preferred embodiment includes a mold resin cylindrical portion 251A and a mold resin base portion 252A. The mold resin cylindrical portion 251A is arranged to extend in the axial direction to assume a substantially cylindrical shape. The stator 21A is covered with the resin of the mold resin cylindrical portion 251A. Note that a portion of the stator 21A, e.g., a radially outer end surface of each of the teeth 42A, may not be covered with the mold resin cylindrical portion 251A. Each of the magnets 33A of the rotor unit 3A is arranged radially outside of the mold resin cylindrical portion 251A. The mold resin base portion 252A is arranged to extend substantially perpendicularly to the central axis 9A axially below the magnets 33A.

As described above, the circuit board 24A is covered with the mold resin portion 25A. This reduces the likelihood of intrusion of water onto the circuit board 24A. In addition, a short circuit between terminals on the circuit board 24A can be prevented.

In a process of manufacturing the motor 1A, the resin is supplied at once to a space surrounding the stator 21A and the circuit board 24A to define the mold resin portion 25A. This leads to improved productivity. Note that the mold resin portion 25A may be arranged to cover, additionally, at least portions of the bearing housing 23A and the base cylindrical portion 221A.

While the motor 1A is running, drive voltages are applied from the external power supply to the coils 213A through the circuit board 24A. As a result, magnetic flux is generated around each of the teeth 42A of the stator core 211A. Then, action of magnetic flux between the teeth 42A and the magnets 33A produces a circumferential torque. As a result, the rotor unit 3A is caused to rotate about the central axis 9A.

Next, pockets included in the stator unit 2A according to the present preferred embodiment will now be described below.

As illustrated in FIG. 2, a first pocket 51A is defined in at least a portion of a surface of the lower insulator 44A, the surface being opposite to the stator core 211A. In the present preferred embodiment, the first pocket 51A is an annular groove centered on the central axis 9A. The first pocket 51A is recessed axially downward from an upper surface of the lower insulator 44A. The first pocket 51A is arranged radially outward of a boundary between the base cylindrical portion 221A and the lower insulator 44A and radially inward of the binding pin 28A.

A sealing agent 50A, such as, for example, an adhesive, is arranged in the first pocket 51A over the entire circumferential extent thereof. This reduces the likelihood of intrusion of water through a gap between the lower insulator 44A and the stator core 211A, leading to improved waterproof performance of the stator unit 2A. In particular, intrusion of water from below the lower insulator 44A (see a dashed arrow 61A) can be blocked at the position of the first pocket 51A. Thus, water is prevented from passing through any coil 213A and the binding pin 28A and reaching the circuit board 24A to cause a dielectric breakdown. In the present preferred embodiment, the first pocket 51A is defined in the lower insulator 44A. Note, however, that the first pocket 51A may alternatively be defined in at least a portion of a surface of the stator core 211A at a lower end thereof, the surface being opposite to the lower insulator 44A.

The sealing agent 50A may be any material that is watertight and can be held in the first pocket 51A to prevent intrusion of a liquid from outside. A sticky material, such as an adhesive, for example, is preferably used as the sealing agent 50A, but this is not essential to the present invention.

In addition, a second pocket 52A is defined in at least a portion of a surface of the upper insulator 43A, the surface being opposite to the stator core 211A. The second pocket 52A is an annular groove centered on the central axis 9A. The second pocket 52A is recessed axially upward from a lower surface of the upper insulator 44A. The second pocket 52A is arranged radially outward of a boundary between the bearing housing 23A and the upper insulator 43A and radially inward of the binding pin 28A.

The sealing agent 50A, such as, for example, the adhesive, is arranged in the second pocket 52A over the entire circumferential extent thereof. This reduces the likelihood of intrusion of water through a gap between the upper insulator 43A and the stator core 211A, leading to improved waterproof performance of the stator unit 2A. In particular, intrusion of water from above the upper insulator 43A through the gap between the upper insulator 43A and the stator core 211A (see a dashed arrow 62A) can be blocked at the position of the second pocket 52A. Thus, water is prevented from passing through any coil 213A and the binding pin 28A and reaching the circuit board 24A to cause a dielectric breakdown. In the present preferred embodiment, the second pocket 52A is defined in the upper insulator 43A. Note, however, that the second pocket 52A may alternatively be defined in at least a portion of a surface of the stator core 211A at an upper end thereof, the surface being opposite to the upper insulator 43A.

Note that a pocket may be defined in the outer circumferential surface of the bearing housing 23A, not only in the insulator 212A and the stator core 211A, and the sealing agent 50A may be arranged in this pocket. That is, the sealing agent is arranged between at least two of the outer circumferential surface of the bearing housing 23A, the stator core 221A, and the insulator 212A. Further, the pocket is defined between at least two of the outer circumferential surface of the bearing housing 23A, the stator core 211A, and the insulator 212A, or alternatively in the vicinity of a position at which all of the above three touch. The sealing agent 50A arranged in the above pocket is able to prevent intrusion of water through a gap between the above members. This leads to improved waterproof performance of the stator unit 2A.

As described above, in the motor 1A including the stator unit 2A according to the first preferred embodiment, an upper portion of the binding pin 28A is not provided with a cover. Next, a motor 1B including a stator unit 2B according to a second preferred embodiment of the present invention, which is different in structure from the first preferred embodiment, and in which an upper portion of a binding pin 28B is provided with a cover, will now be described below.

Figure 3:
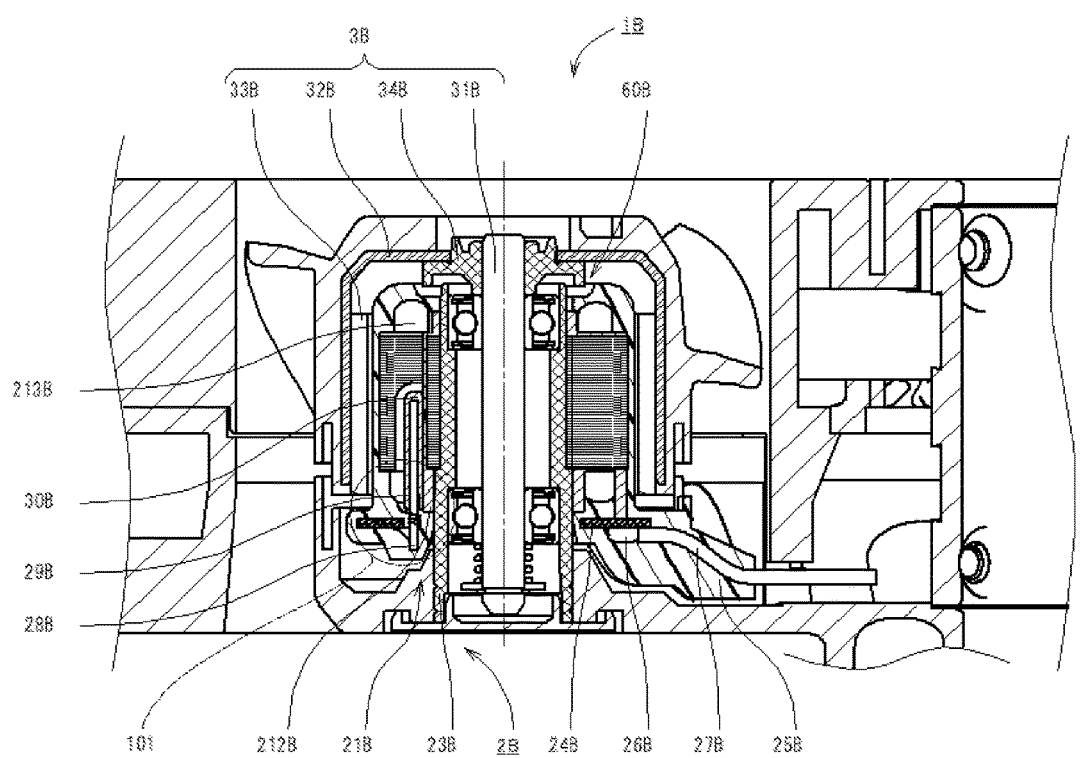
FIG. 3 is a vertical sectional view of a motor according to a second preferred embodiment of the present invention.
Figure 4:
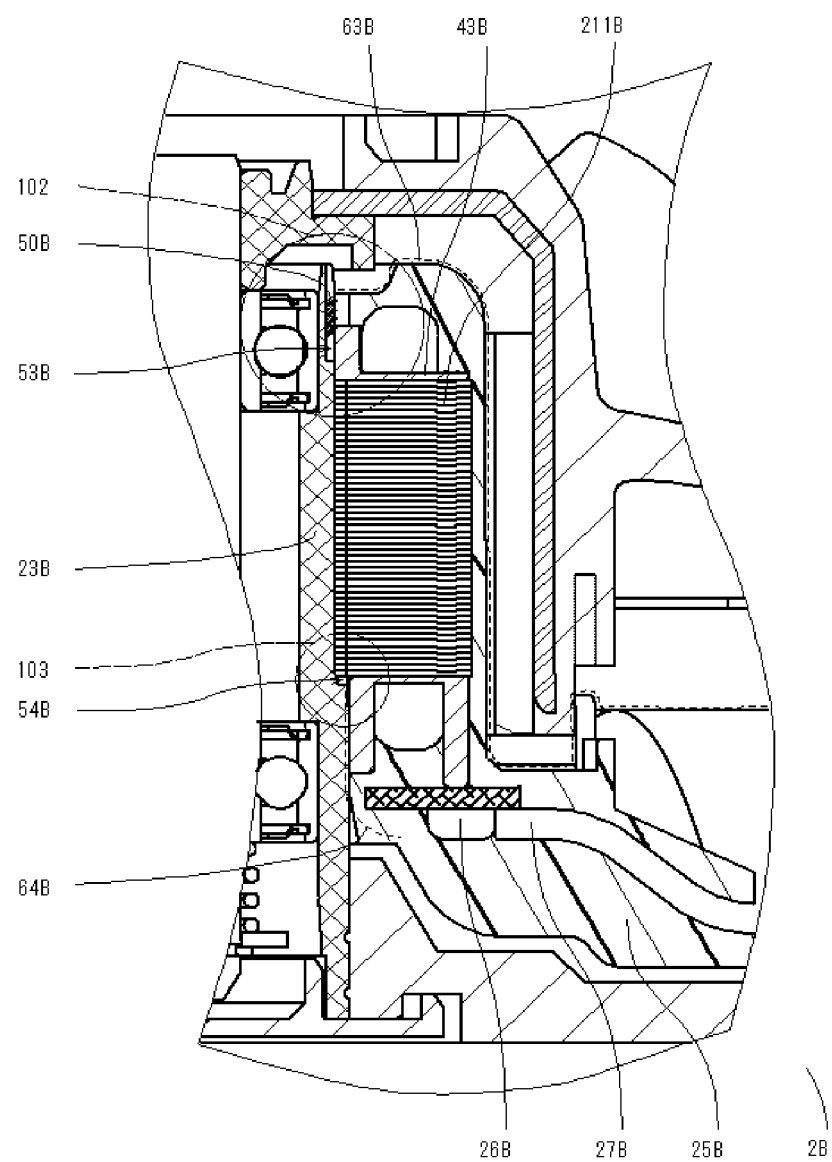
FIG. 4 is a partial vertical sectional view of the motor according to the second preferred embodiment of the present invention.

Next, the second preferred embodiment of the present invention will now be described below. FIG. 3 is a vertical sectional view of the motor 1B including the stator unit 2B according to the second preferred embodiment. FIG. 4 is a partial vertical sectional view of the motor 1B. Note that the second preferred embodiment will be described below with focus on differences from the first preferred embodiment, and that features of the second preferred embodiment which are shared by the first preferred embodiment, and features of the second preferred embodiment which have already been described in reference to the first preferred embodiment will not be described to avoid redundancy.

Figure 3A:
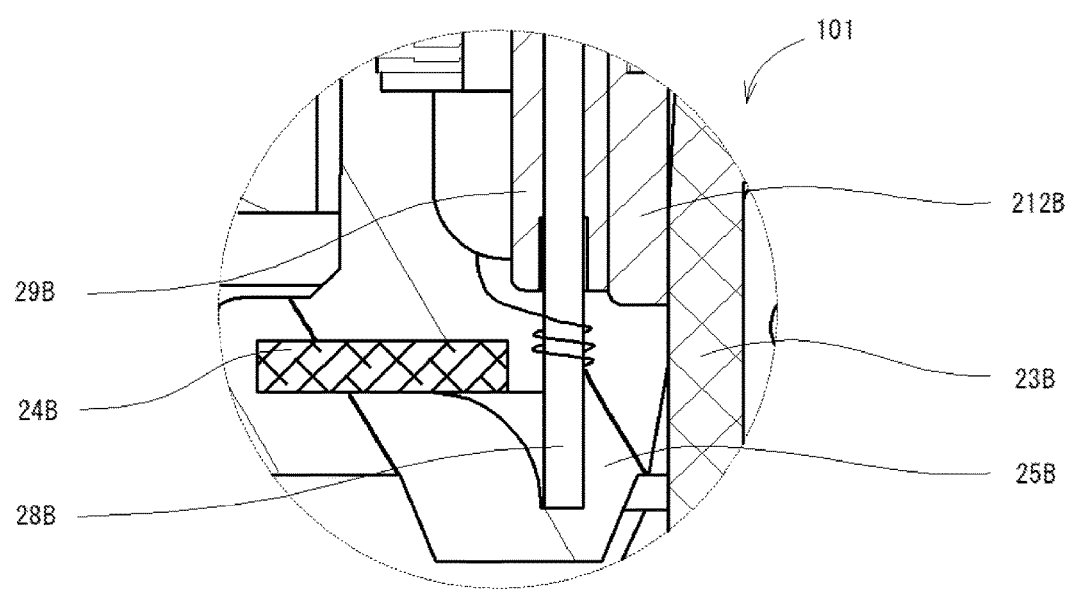
FIG 3A is an enlarged view of a portion 101 of FIG. 3.

Referring to FIG. 3, and a portion 101 which is enlarged in FIG. 3A, an insulator 212B includes an upper cover portion 30B arranged to cover an upper side of a pin support portion 29B. The binding pin 28B is covered by the pin support portion 29B, the upper cover portion 30B, and a mold resin portion 25B. This reduces the likelihood of intrusion of water through a gap between the binding pin 28B and a coil 213B, leading to improved waterproof performance of the stator unit 2B.

In addition, the motor 1B according to the present preferred embodiment includes an annular labyrinth structure 60B in at least a portion of a space enclosed by a bearing housing 23B, a rotor holder 32B, and the mold resin portion 25B. The labyrinth structure 60B is defined by a convoluted gap defined between two opposed members having a projection and a recess opposite to each other. The labyrinth structure 60B is arranged to reduce the likelihood that water will intrude radially inward through a space between a rotor unit 3B and the stator unit 2B. The likelihood of intrusion of water onto the rotor unit 3B can thus be reduced, leading to improved waterproof performance of the motor 1B.

In particular, the rotor unit 3B according to the present preferred embodiment includes an annular member 34B arranged to join a shaft 31B and the rotor holder 32B to each other. The labyrinth structure 60B is defined in at least a portion of a space enclosed by the annular member 34B, the bearing housing 23B, the rotor holder 32B, and the mold resin portion 25B. More specifically, a convoluted gap is defined between a projecting portion defined in the annular member 34B and a recessed portion defined in the mold resin portion 25B. The likelihood of intrusion of water onto the rotor unit 3B can thus be reduced, leading to improved waterproof performance of the motor 1B.

Referring to FIGS. 3 and 4, a conductor holding portion 26B is arranged on a lower surface of a circuit board 24B. The conductor holding portion 26B is arranged to hold a plurality of lead wires 27B. In the present preferred embodiment, one end portion of each lead wire 27B is connected to the conductor holding portion 26B, and another end portion of the lead wire 27B is arranged to extend outwardly of the mold resin portion 25B to be connected to a power supply unit or the like installed outside of the motor 1B. The mold resin portion 25B is arranged to hold a stator 21B, the circuit board 24B, and the conductor holding portion 26B.

Next, pockets included in the stator unit 2B according to the present preferred embodiment will now be described below.

As illustrated in FIG. 4, a third pocket 53B is defined in at least a portion of a surface of the bearing housing 23B, the surface lying on an outer circumferential surface of the bearing housing 23B and being opposite to an upper insulator 43B. The third pocket 53B is an annular groove centered on a central axis. The third pocket 53B is recessed radially inward from the outer circumferential surface of the bearing housing 23B in the vicinity of an upper end portion of the bearing housing 23B. A portion of the third pocket 53B is arranged radially opposite to an inner circumferential surface of the upper insulator 43B.

Figure 4A:
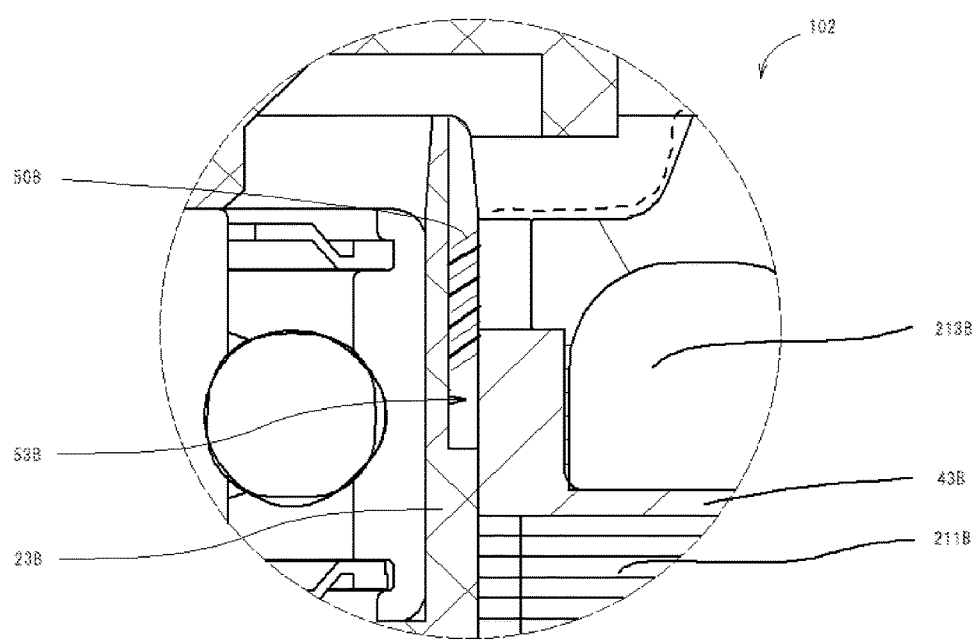
FIG 4A is an enlarged view of a portion 102 of FIG. 4.

As shown in portion 102 which is enlarged in FIG. 4A, a sealing agent 50B, such as, for example, an adhesive, is arranged in the third pocket 53B over the entire circumferential extent thereof. This reduces the likelihood of intrusion of water through a gap between the bearing housing 23B and the upper insulator 43B. This leads to improved waterproof performance of the stator unit 2B. In particular, the likelihood of intrusion of water from above the upper insulator 43B (see a dashed arrow 63B) can be reduced.

In the present preferred embodiment, the third pocket 53B is arranged to open axially upward. The third pocket 53B can be defined by cutting the bearing housing 23B from axially above when the motor 1B is manufactured. This leads to improved productivity in a process of manufacturing the motor 1B.

Figure 5:
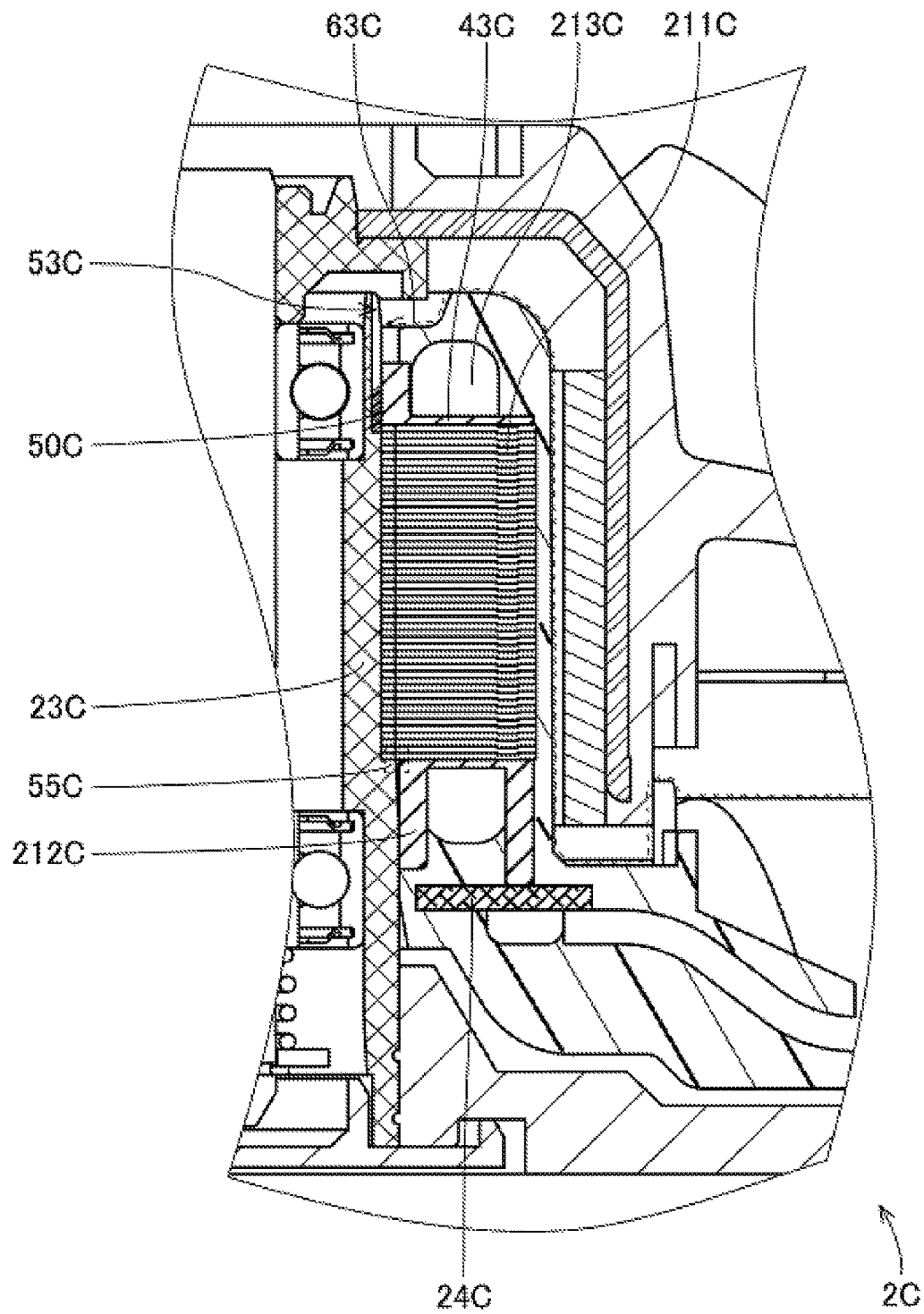
FIG. 5 is a partial vertical sectional view of a motor according to a modification of the second preferred embodiment of the present invention.

Referring to FIG. 5, in a modification of the second preferred embodiment, a third pocket 53C may be arranged to extend downward to such an extent that a lower end of the third pocket 53C is on a surface of a bearing housing 23C, the surface lying on an outer circumferential surface of the bearing housing 23C and being opposite to at least a portion of a stator core 211C. Also in this modification, a sealing agent 50C, such as, for example, an adhesive, is arranged in the third pocket 53C. This reduces the likelihood of intrusion of water through a gap between the bearing housing 23C and each of an upper insulator 43C and the stator core 211C (see a dashed arrow 63C). This leads to improved waterproof performance of a stator unit 2C.

Figure 4B:
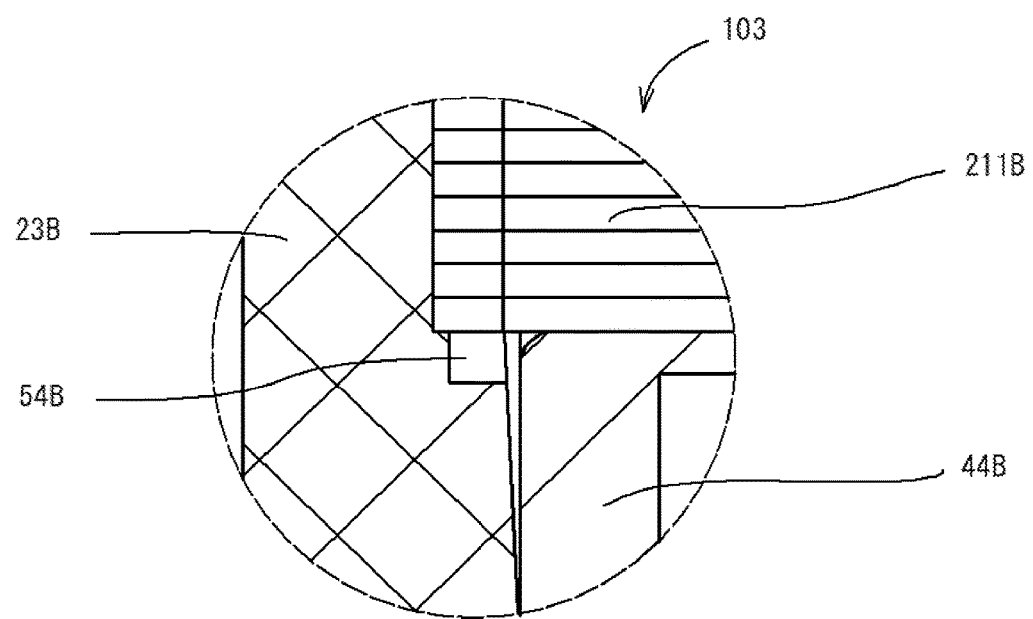
FIG. 4B is an enlarged view of a portion 103 of FIG. 4.

Reference is made again to FIG. 4 and also to portion 103 which is enlarged in FIG. 4B. A fourth pocket 54B is defined in at least a portion of a surface of the bearing housing 23B, the surface lying on the outer circumferential surface of the bearing housing 23B and being axially opposite to a stator core 211B and below the stator core 211B. The fourth pocket 54B is an annular groove centered on the central axis 9B. The fourth pocket 54B is recessed axially downward from the surface of the bearing housing 23B which is axially opposite to the stator core 211B. In addition, the fourth pocket 54B is arranged radially opposite to an inner circumferential surface of a lower insulator 44B.

The sealing agent 50B, such as, for example, the adhesive, is arranged in the fourth pocket 54B over the entire circumferential extent thereof. This reduces the likelihood of intrusion of water through a gap between the bearing housing 23B and the stator core 211B (see a dashed arrow 64B). This leads to improved waterproof performance of the stator unit 2B.

If no sealing agent were provided in the stator unit 2C illustrated in FIG. 5, for example, water might travel through a gap between at least two of the outer circumferential surface of the bearing housing 23C, the stator core 211C, and an insulator 212C, or through a gap in any of the above members, and reach a circuit board 24C through a coil 213C and/or a binding pin (not shown).

Accordingly, like the fourth pocket 54B in the second preferred embodiment, a pocket may be defined in the vicinity of a position 55C at which the outer circumferential surface of the bearing housing 23C, the stator core 211C, and the insulator 212C adjoin, and the sealing agent 50C may be arranged in the pocket. This will efficiently prevent intrusion of water or the like from outside and travel thereof. A cutting process and other processing can be performed relatively easily on the outer circumferential surface of the bearing housing 23C and the insulator 212C, among the outer circumferential surface of the bearing housing 23C, the stator core 211C, and the insulator 212C, and it is therefore desirable that the pocket be defined in the outer circumferential surface of the bearing housing 23C or in the insulator 212C.

Figure 6:
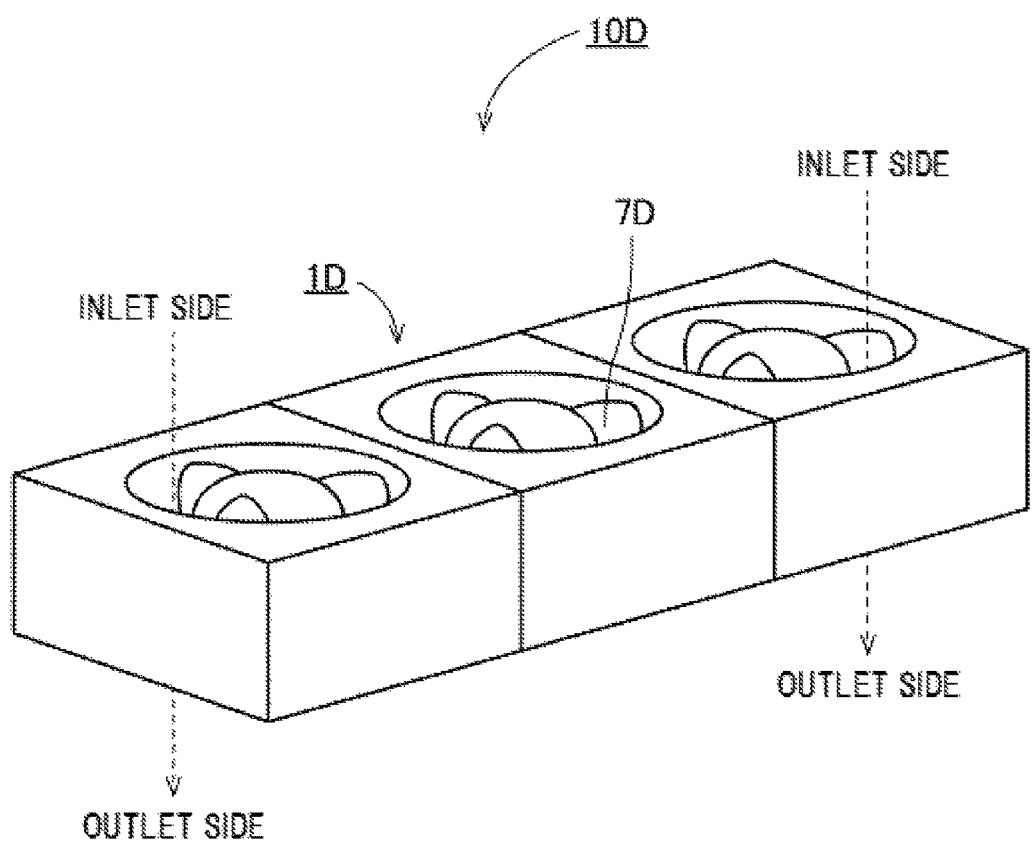
FIG. 6 is a perspective view of a parallel fan according to a third preferred embodiment of the present invention.

Next, a third preferred embodiment of the present invention will now be described below. FIG. 6 illustrates a parallel fan 10D including a plurality of motors (i.e., fan motors) 1D arranged in a radial direction, each motor 1D including an impeller 7D. Each motor 1D is identical to any of the motors according to the above-described preferred embodiments and the modifications thereof. In the parallel fan 10D as described above, each of a stator, a circuit board, and so on has substantially the same size in each of the motors 1D.

In the case of the parallel fan 10D as described above, a mold resin portion is typically obtained by first placing a motor housing, the stator, and the circuit board in a mold, and then pouring a resin into a cavity in the mold and curing the resin. However, a parallel fan including a plurality of fans arranged in parallel requires a different dedicated mold depending on the number of motors arranged in parallel.

In contrast, in the case of the third preferred embodiment of the present invention, the mold resin portion is defined in the stator unit when the stator unit is manufactured, and only one mold is enough to mold the stator unit of each motor 1D regardless of the number of motors 1D arranged in parallel. That is, the one mold can be used again and again to manufacture the motors 1D, which leads to improved productivity.

While preferred embodiments of the present invention have been described above, it will be understood that the present invention is not limited to the above-described preferred embodiments.

For example, it has been assumed that, in each of the above-described preferred embodiments, a specified material, such as the adhesive, is used as the sealing agent. That is, it has been assumed that, when the motor including the stator unit is manufactured, one type of sealing agent is prepared, and this sealing agent is arranged in each of the plurality of pockets.

Note, however, that a different sealing agent may be arranged in each of the first, second, third, and fourth pockets.

The viscosity of the sealing agent may be varied depending on where the sealing agent is arranged. For example, a sealing agent having a relatively high viscosity may be arranged in a slanted pocket. Also, the components and type of the sealing agent may be varied in accordance with the material of the member on which the sealing agent is arranged, to prevent the member from gathering rust or becoming corroded, or to reduce deterioration in watertightness and airtightness due to aging.

In each of the above-described first and second preferred embodiments, two pockets are defined in one motor. Note, however, that the number of pockets defined in one motor may alternatively be one or three or more.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to stator units and motors including the stator units.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator unit comprising:
   a cylindrical bearing housing extending along a central axis extending in a vertical direction;
   a base member fixing the bearing housing;
   a stator fixed to an outer circumferential surface of the bearing housing; and
   a mold resin portion covering the stator; wherein
   the stator includes:
      a stator core including a plurality of teeth projecting radially outward;
      an insulator covering a portion of a surface of the stator core; and
      a plurality of coils each of which is defined by a conducting wire wound around a separate one of the teeth with the insulator therebetween; and
   a sealing agent is located between the outer circumferential surface of the bearing housing and the insulator, and/or between the insulator and the stator core.

2. The stator unit according to claim 1, wherein
   the insulator includes an upper insulator covering an upper portion of the stator core, and a lower insulator covering a lower portion of the stator core;
   the lower insulator includes a first pocket recessed axially downward, the first pocket being defined in at least a portion of a surface of the lower insulator, the surface being opposite to the stator core; and
   at least a portion of the sealing agent is in the first pocket.

3. The stator unit according to claim 1, wherein
   the insulator includes an upper insulator covering an upper portion of the stator core, and a lower insulator covering a lower portion of the stator core;
   the upper insulator includes a second pocket recessed axially upward, the second pocket being defined in at least a portion of a surface of the upper insulator, the surface being opposite to the stator core; and
   at least a portion of the sealing agent is in the second pocket.

4. The stator unit according to claim 1, wherein
   the bearing housing includes a third pocket defined in at least a portion of a surface thereof, the surface being opposite to the stator core or the insulator; and
   at least a portion of the sealing agent is in the third pocket.

5. The stator unit according to claim 4, wherein the third pocket opens upward.

6. The stator unit according to claim 1, wherein
   the bearing housing includes a fourth pocket recessed axially downward, the fourth pocket being defined in at least a portion of a surface of the bearing housing, the surface being axially opposite to the stator core and below the stator core; and
   at least a portion of the sealing agent is in the fourth pocket.

7. The stator unit according to claim 1, wherein
   the stator further includes a binding pin around which an end portion of the conducting wire is bound; and
   the insulator includes a cylindrical pin support portion supporting the binding pin.

8. The stator unit according to claim 7, wherein the insulator further includes an upper cover portion covering an upper side of the pin support portion.

9. The stator unit according to claim 1, wherein the mold resin portion further covers a portion of the bearing housing.

10. The stator unit according to claim 1, further comprising a circuit board below the stator, wherein
    the stator is electrically connected to the circuit board; and
    the mold resin portion further covers the circuit board.

11. A motor comprising:
    the stator unit of claim 1; and
    a rotor unit rotatably supported by the bearing housing; wherein
    the rotor unit includes:
    a magnet;
    a rotor holder supports the magnet; and
    a shaft inserted inside of the bearing housing; and
    at least a portion of a space enclosed by the bearing housing, the rotor holder, and the mold resin portion includes a labyrinth structure defined therein.

12. The motor according to claim 11, wherein
    the rotor unit further includes an annular member joining the shaft and the rotor holder to each other; and
    the labyrinth structure is defined in at least a portion of a space enclosed by the annular member, the bearing housing, the rotor holder, and the mold resin portion.

13. A parallel fan comprising a plurality of fans arranged in a radial direction, each of the plurality of fans including the motor of claim 11.

* * * * *